United States Patent
Lieffring

[15] 3,673,626
[45] July 4, 1972

[54] VEHICLE WASH APPARATUS

[72] Inventor: Gordon V. Lieffring, 2 East Gregory Boulevard, Kansas City, Mo. 64114

[22] Filed: March 15, 1971

[21] Appl. No.: 124,221

Related U.S. Application Data

[62] Division of Ser. No. 831,598, June 9, 1969, Pat. No. 3,581,333.

[52] U.S. Cl. ................................15/97 R, 15/DIG. 2
[51] Int. Cl. ...............................................B60s 3/04
[58] Field of Search .............15/DIG. 2, 21 D, 21 E, 97, 15/302

[56] References Cited

UNITED STATES PATENTS

| | | | |
|---|---|---|---|
| 3,499,180 | 3/1970 | Hurwitz | 15/97 R |
| 3,510,898 | 5/1970 | Tatara et al. | 15/97 R X |
| 3,403,417 | 10/1968 | Hanna et al. | 15/21 D |
| 3,160,903 | 12/1964 | Grass | 15/97 R |

FOREIGN PATENTS OR APPLICATIONS 459,782  9/1968  Switzerland..........................15/DIG. 2

*Primary Examiner*—Edward L. Roberts
*Attorney*—Fishburn, Gold and Litman

[57] ABSTRACT

An automatic vehicle washing apparatus having a mobile carriage for movement along a predetermined path to wash a vehicle parked within such path. The improvement includes a standard swingably mounted on the carriage with a brush arm extending therefrom and supporting an arm with a mop frame movable thereon and supporting a depending fabric member with strips for engaging the upper surfaces of the vehicle during the washing cycle. The apparatus has controls whereby at the end of the washing cycle the standard is swung to move the brush arm and mop arm to a position trailing the carriage and away from the vehicle. The apparatus has a structure responsive to change of direction of the carriage for moving the mop arm toward but spaced from the vehicle and thereby reduce the space required for the path of the apparatus.

6 Claims, 10 Drawing Figures

INVENTOR.
Gordon V. Lieffring
BY
ATTORNEYS

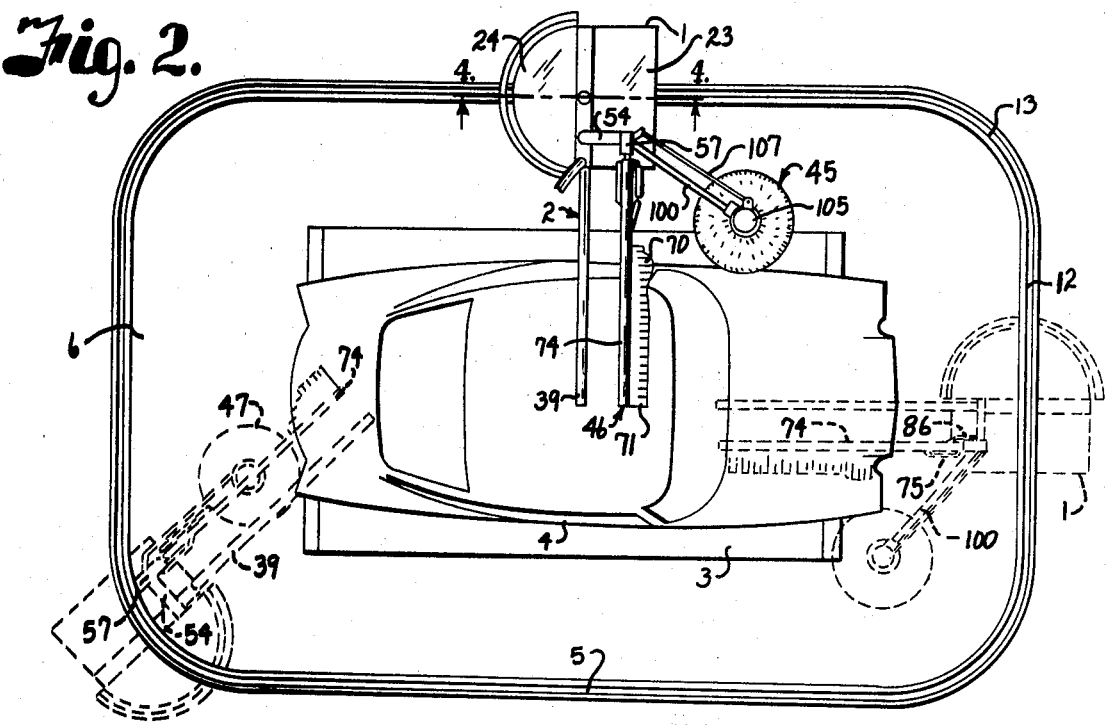
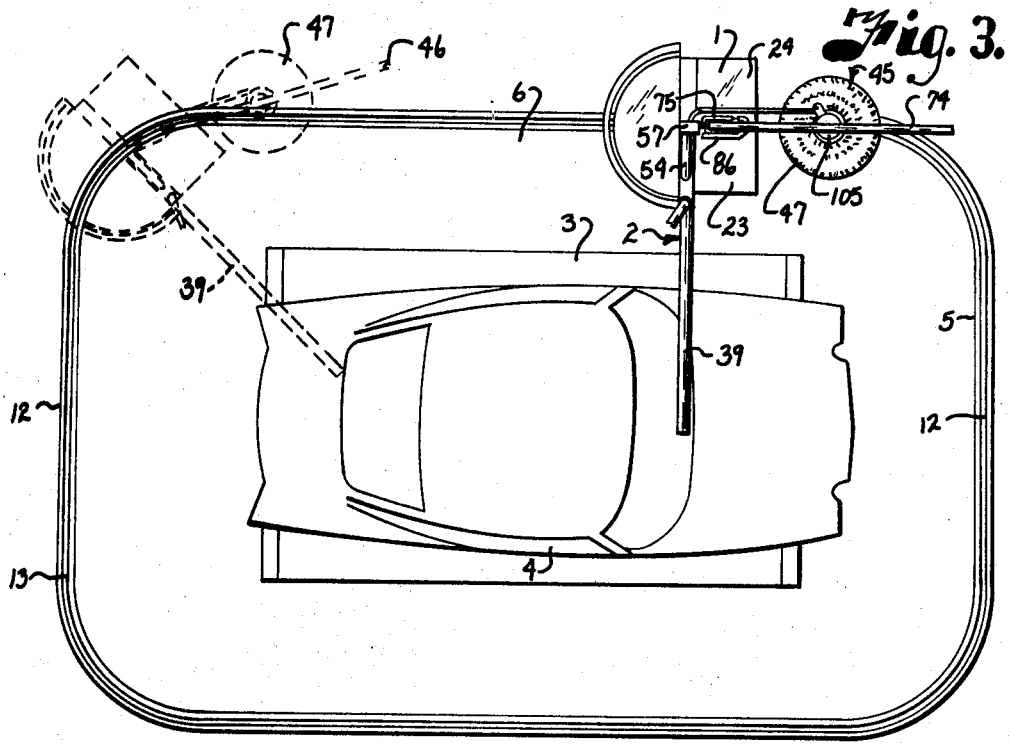

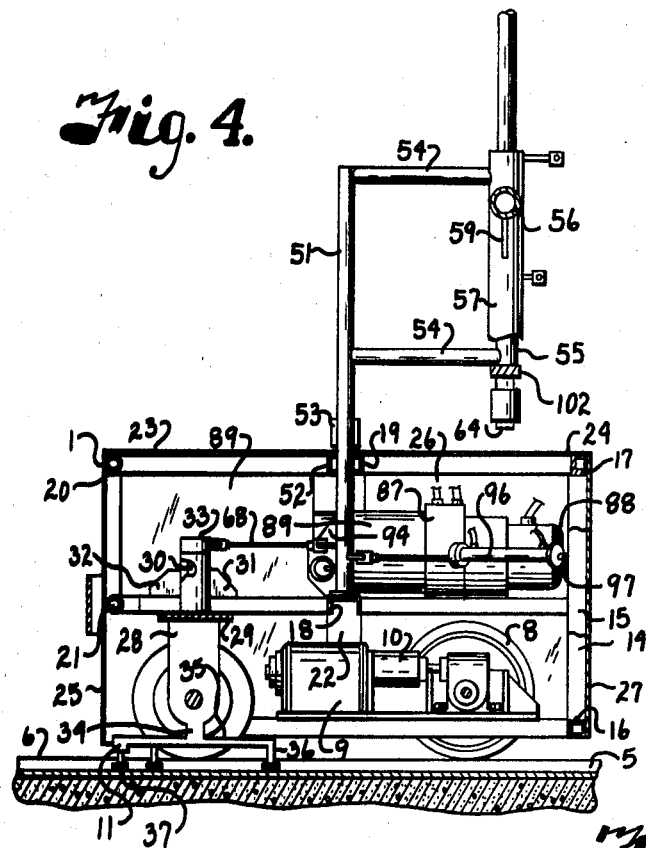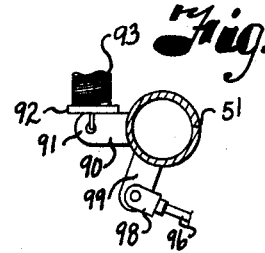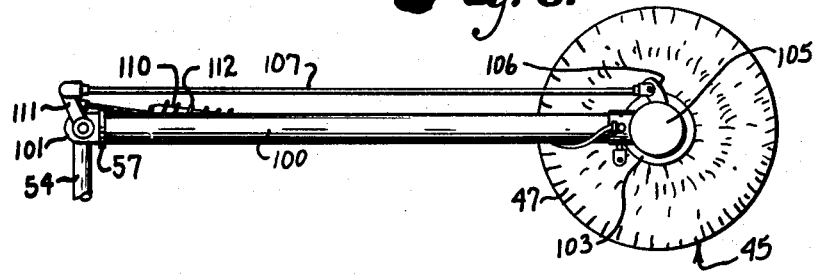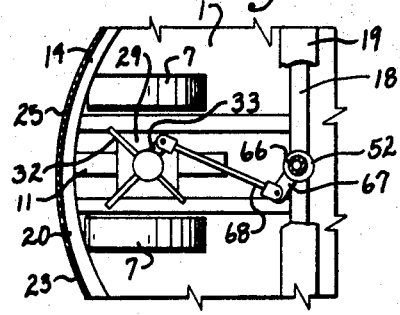

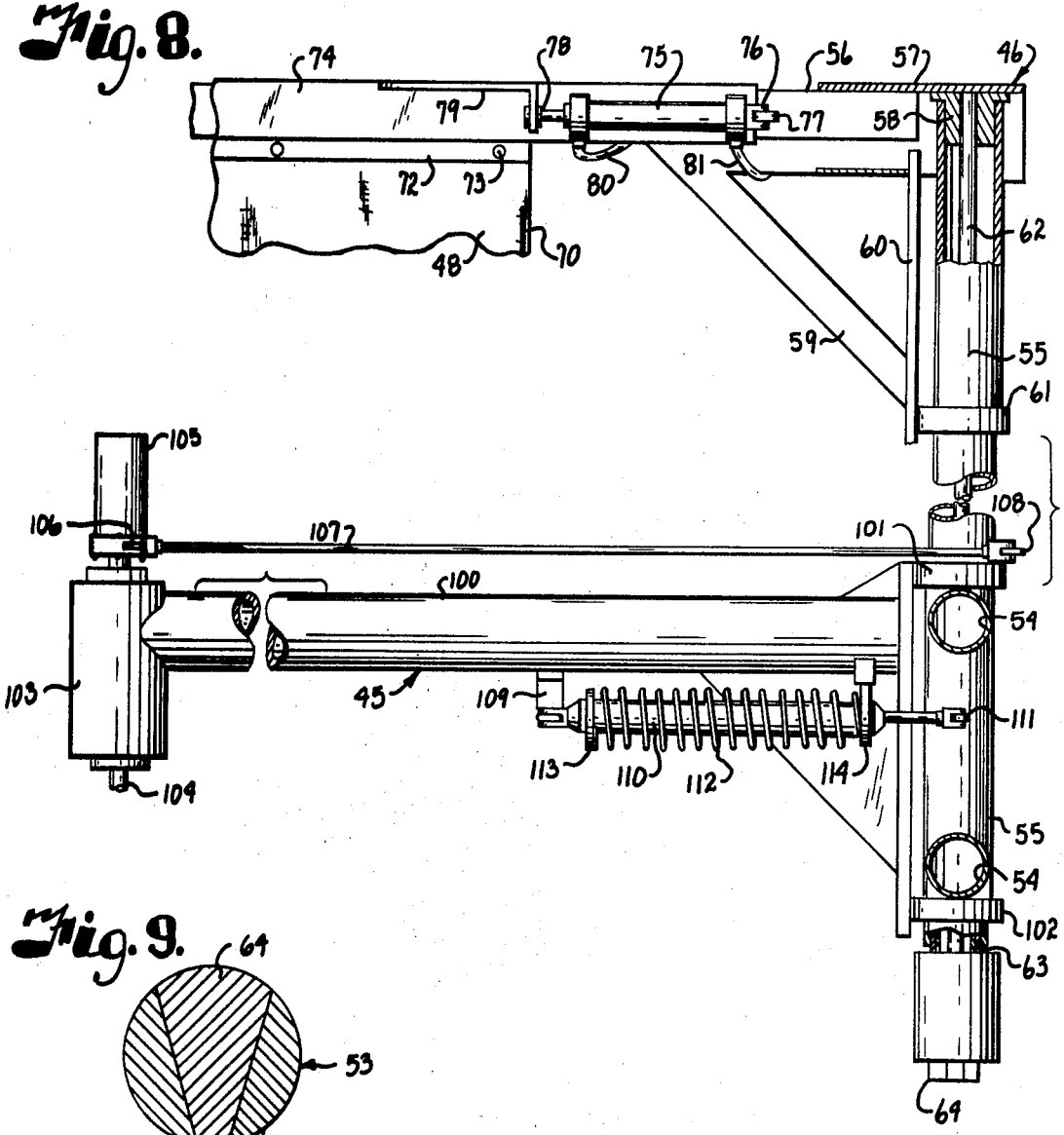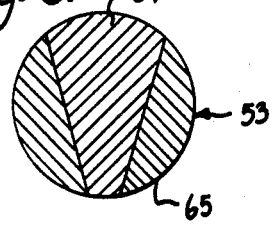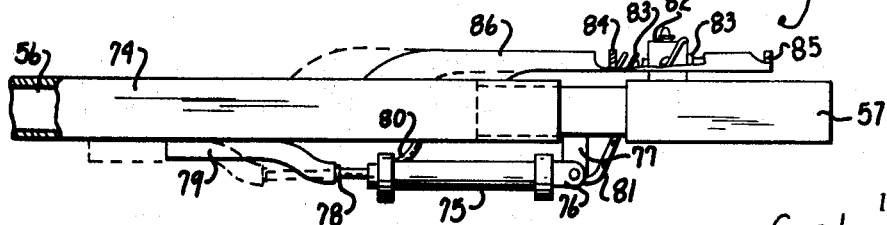

VEHICLE WASH APPARATUS

This application is a division of my copending application on Vehicle Wash Apparatus, Ser. No. 831,598, filed June 9, 1969, now U.S. Pat. No. 3,581,333 issued June 1, 1971.

BACKGROUND OF THE INVENTION

This invention relates to an apparatus for automatically washing vehicles such as automobiles and more particularly to apparatus that moves relative to an automobile to perform a washing function.

In the car washing industry there have been various arrangements of structure having a plurality of brushes used with water and detergent wherein the brushes are rotated against the vehicle surface to clean same. There has been difficulty with such structures because of danger of damaging windshield wipers, radio aerials and the like, also the brushes may become hooked on some portions of the vehicle. These difficulties were overcome by use of high pressure sprays of hot water and detergent during washing cycles and then a wash-rinse cycle with the spray structure being carried by a mobile carriage moved in a path about the parked vehicle. However, in some areas the vehicle surfaces become coated with soot, chemical deposits and various types of soil which are difficult to dissolve and remove from the vehicle surface in a short washing period by the high pressure sprays.

The principal objects of the present invention are to provide an automatic vehicle washing apparatus utilizing high pressure sprays moved relative to a parked vehicle to contact the surfaces thereof and having flexible members movably contacting the vehicle surfaces for removing soil therefrom; to provide such a structure wherein a rotating brush contacts the vehicle sides in trailing relation to the sprays during the washing cycle and a wiper or mop contacts the upper surfaces so as to provide cleaning without damage to any parts of the vehicle; to provide such a structure with controls wherein the wiper or mop trails a mobile carriage and upon starting a washing cycle it is swung to a position to contact the vehicle and at the end of the washing cycle it is swung back to trailing position; to provide such an apparatus wherein the mop or wiper is reciprocated laterally as it moves over the vehicle surfaces during the washing cycle; to provide such an apparatus wherein the brush and wiper are moved to trailing position after the wash cycle and structure responsive to the change of direction of the path of the carriage swings the mop arm toward the vehicle but spaced therefrom to reduce the area necessary for the path of movement of the washing apparatus; and to provide a car washing apparatus which is economical, long-wearing, and efficient in removing soil from a vehicle surface in a coin operated type system so as to be automatic with no attendant or operator required to perform or operate the washing operation.

Other objects and advantages of this invention will become apparent from the following description taken in connection with the accompanying drawings wherein are set forth by way of illustration and example certain embodiments of this invention.

BRIEF DESCRIPTION OF THE DRAWINGS

FIG. 2 is a plan view of the vehicle washing apparatus with the carriage, spray unit, and mop and brush assemblies shown in solid lines after start of the washing and the position of the carriage spray unit, mop and brush assemblies in other positions of the path of travel shown in broken lines.

FIG. 3 is a plan view of the vehicle washing apparatus similar to FIG. 2 with the brush and mop assemblies shown in solid lines in the position during starting of the rinsing and the position of said mop and brush assemblies as the carriage moves around the corner of the path of travel shown in broken lines.

FIG. 4 is a vertical sectional view through the carriage taken on the line 4—4, FIG. 2.

FIG. 5 is an enlarged detail view showing the connections to the standard for rotating same.

FIG. 6 is a plan view of a portion of the standard and the brush arm and brush assembly mounted thereon.

FIG. 7 is a fragmentary horizontal sectional view through the carriage showing the connection between the path follower and the mop mounting clutch.

FIG. 8 is a fragmentary elevational view of the standard, brush arm, and mop arm mounted thereon.

FIG. 9 is a transverse sectional view through the mop clutch members.

FIG. 10 is a fragmentary plan view of the mop arm and mop reciprocating means thereon.

DESCRIPTION OF THE PREFERRED EMBODIMENT

Figure 1:
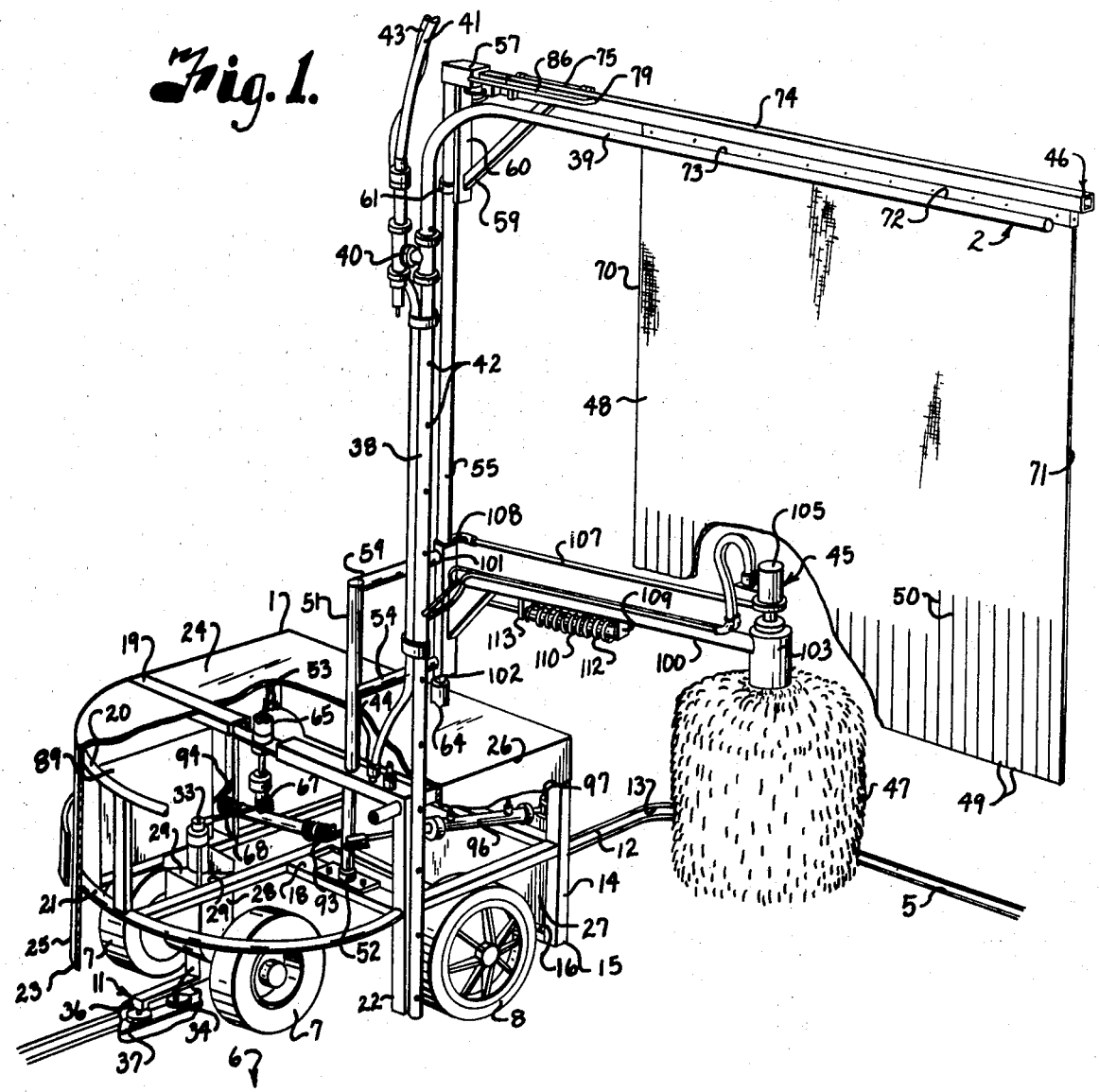
FIG. 1 is a perspective view of the mobile vehicle washing apparatus embodying the present invention with portions of the carriage housing broken away to show the structure therein.

Referring in detail to the drawings, the vehicle washing apparatus has a mobile carriage 1 supporting a spray unit 2 and movable in a path around a vehicle wash position 3 in which a vehicle 4 is parked during the washing and rinsing operations. In the structure illustrated, the path of the carriage 1 is defined by a track 5 whereby the carriage moves around the vehicle in an orbit and sprays water and detergent on the vehicle during the washing operation or cycle and water on the vehicle during rinsing operation or cycles under control of an electric control circuitry as shown and described in the Widner U.S. Pat. No. 3,315,691, issued Apr. 25, 1967.

In the structure illustrated, the carriage 1 runs on a floor 6 and is supported by front wheels 7 and rear wheels 8. At least one of the wheels is a traction wheel driven by a motor 9 through a speed reduction mechanism 10 to propel the carriage over the floor 6. It is preferred that the motor 9 be a two-speed motor whereby the speed of travel of the carriage may be varied. The carriage is adapted to be moved in orbit around the vehicle and in the structure illustrated a guide means 11 operates in the track 5 that extends around the vehicle wash position and guides the carriage in its orbit therearound. The track 5 preferably has straight portions 12 at sides and ends connected at the corners by curved or arcuate portions 13 to define a generally rectangular path.

The carriage 1 preferably includes a mobile frame 14 that has laterally spaced side members 15 connected at the rear by vertically spaced transverse members 16 and 17 and intermediate transverse members 18 and 19, the forward portion of the frame being arcuate upper and lower members 20 and 21 which have rear end portions connected to upright members 22 of the side frame adjacent the intermediate transverse members 18 and 19. Mounted on the frame is a casing or shell 23 which has a top wall 24, an arcuate front wall 25, side walls 26, and a rear wall 27, which cooperate to form an open bottom enclosure. In the structure illustrated, the front wheels are rotatably mounted on a support 28 which engages a thrust plate 29 and has an upstanding spindle 30 rotatably mounted in a bearing 31 mounted on the thrust plate and supported by spaced frame members 32. The upper end of the spindle has an arm 33 fixed thereto for rotative movement therewith, as later described. The support 28 has a depending member 34 carrying the guide means 11 which includes a guide support 35 that extends forwardly and rearwardly therefrom. The guide support 35 has depending members 36 mounting rollers or guide members 37 which engage in the track 5. The guide support and rollers are arranged whereby they steer the wheels 7 to move the carriage in its path when propelled by operation of the motor 9.

The spray unit 2 is mounted on the carriage, and in the illustrated structure, said spray unit includes a generally upright portion 38 that terminates in a generally horizontal portion 39 that is adapted to be disposed over the top of a vehicle to be washed, with the upright portion 38 spaced outwardly from the vehicle whereby said spray unit is generally L-shaped. The spray unit is connected through a fitting 40 with a fluid delivery conduit 41 that is adapted to selectively supply at high pressure, hot water and detergent to the spray unit for delivery through spray nozzles 42 which are spaced along the upright portion 38 and the horizontal portion 39 of the spray unit. During the rinse cycle, high pressure water is delivered through the conduit 41 for rinsing the vehicle. The spray nozzles 42 are arranged to direct fan shaped sprays generally in a plane substantially perpendicular to the surface of the vehicle body with the sprays overlapping to form a spray curtain that impinges on the body surface as the carriage moves therearound. It is preferred that the spray unit be arranged substantially midway the length of the carriage 1 and extend outwardly therefrom generally perpendicular thereto. Power is supplied for operation of the carriage and mechanism carried thereby by conductors in an electrical conduit 43 which extends from controls (not shown) downwardly along the upright portion 38 of the spray unit and into the carriage portion as at 44.

The carriage 1 has brush and wiper or mop assemblies 45 and 46 movably mounted for swinging from a generally trailing position relative to the carriage to a position for engaging portions of the vehicle body. In the structure illustrated, the brush assembly 45 includes a rotary brush 47 adapted to engage the side and ends of the vehicle from a level above the lower portion of the windows to below the bottom edges of the side and ends of the vehicle body or bumpers.

The mop assembly 46 includes a fabric, flexible member 48 having a plurality of side by side strips 49 in its lower portion preferably formed by parallel cuts 50 therein. The member 48 is of such length that as the carriage moves around the vehicle, the lower portion of said member will wipe the top portions of the hood, fenders, top and trunk portions of the body. It is preferred that the engagement of the brush and the mop or fabric member 48 with the vehicle be at locations in trailing relation to the spray unit.

To facilitate control, both the brush assembly 45 and mop assembly 46 are movably mounted relative to the carriage 1 by the same support structure which consists of a standard 51 rotatably mounted in bearings 52 and 52' carried by transverse members 18 and 19, respectively, the said standard extending upwardly above the top wall 24 of the casing 23. A control structure 53 is centrally located on the carriage for operation, as later described, and the standard 51 is arranged between said control structure and the spray unit 2 with the spacing between the standard and the control unit being substantially the distance by which it is desired that the mop assembly trail the spray unit when in washing position. The standard has spaced arms 54 extending therefrom and mounting a tubular post 55, said post being coaxial with the control unit 53 when the mop and brush assemblies are swung to inoperative positions, as during rinsing operations.

A mop supporting arm 56 is mounted on the upper portion of the post 55 and extends therefrom. In the structure illustrated, the arm 56 has a plate portion 57 resting on a bearing 58 in the upper end of the post. The arm also has a brace 59, an upright portion 60 mounting a bearing sleeve 61 rotatably engaging the post 55. The plate 57 is connected to a shaft 62 that extends downwardly in the post with the lower portion mounted in a bearing 63, said shaft having a clutch member 64 fixed to its lower end and adapted to engage a mating clutch member 65 of the control structure 53. The clutch member 65 is mounted on a shaft 66 rotatably supported on the transverse members 19 and has an arm 67 at its lower end connected by a link 68 to the arm 33 on the spindle 30 whereby rotative movement of the spindle in response to curves in the guide track or change of direction of the carriage will move the clutch member, as later described.

The fabric member 48 is preferably a moisture resistant cellulose material similar to what is commonly referred to as indoor/outdoor carpeting, or is treated whereby the moisture does not soak into the fibers and water quickly drains therefrom. The width is such that it is greater than one-half the width of a vehicle whereby when the side edge 70 adjacent the spray unit is outwardly of the vehicle side, the inner side edge 71 extends beyond the center of the vehicle roof, as illustrated in FIG. 2. The upper edge of the fabric member 48 is preferably clamped between bar portions 72 by suitable fastening devices 73, said bar portions being mounted on a sleeve 74 slidably mounted on the arm 56. In the structure illustrated, the arm and sleeve are non-circular in cross section to prevent rotation when lateral force is applied to the fabric member.

The fabric member 48 is preferably reciprocated as it moves over the vehicle, and in the structure illustrated, a hydraulic ram 75 has one end connected as at 76 to an ear 77 extending outwardly from the arm 56, the other end of the extensible member or ram being connected as at 78 to a bracket 79 on the sleeve 74 whereby extension and contraction of the ram or extensible member reciprocates the mop member. The ram is supplied with fluid pressure through flow lines 80 and 81 which lead from a valve 82 which have oppositely disposed control members 83 actuated by abutment members 84 and 85 spaced on an arm 86 fixed to the sleeve 74. The valve is of a conventional reversing type whereby when the sleeve approaches the end of the stroke in one direction as toward the vehicle the abutment 85 engages the control to actuate the valve and reverse the flow of fluid to the ram whereby the sleeve is moved in the other direction, the movement continuing until the abutment 84 engages the valve control member to again reverse the flow.

The fluid pressure is preferably supplied by a hydraulic pump 87 driven by a motor 88 with a supply of fluid provided by a tank 89. The pump 87, motor 88, and tank 89 are preferably mounted on the carriage frame at the side thereof away from the vehicle whereby the weight aids in counterbalancing the weight of the mop and brush units when extended toward the vehicle. The motor 88 is connected in the control circuit for the washing apparatus whereby said motor drives the pump 87 to supply hydraulic pressure at the start of the movement of the carriage and the supply of wash water to the spray unit in starting the washing operation. The power to the motor 88 is discontinued at the end of the washing cycle, and upon stopping of the motor, the fluid pressure supply to the ram 75 stops, stopping reciprocation of the mop member 48.

The standard 51 has an ear 90 connected to a rod 91 with an abutment 92 engaged by one end of a spring 93 under compression, the other end of the spring abuts against a seat member on an upright of the frame, as at 94, whereby the spring urges the standard to swing the post and brush and mop assemblies carried thereby away from the vehicle to a position wherein the clutch member 64 engages with the clutch member 65, as illustrated in FIG. 9. A single acting ram 96 has one end connected as at 97 to the carriage frame and the other end connected as at 98 to an ear 99 on the standard 51. When the motor 88 is energized to drive the pump 87, hydraulic pressure is applied to the single acting ram extending same and rotating the standard 51 to swing the mop and brush assemblies toward the vehicle. When the motor is stopped, the spring 93 causes the ram to contract and permit the swinging of the standard to move the brush assembly and mop away from the vehicle.

The brush assembly includes an arm 100 with spaced bearing members 101 and 102 rotatably mounted on the post 55 for swinging movement of the arm 100. At the outer end of the arm 100 there is a bearing member 103 rotatably mounting a shaft 104 which has a brush 47 fixed thereto, said brush being of the type with long, flexible bristles of soft material that will not damage the finish of a vehicle. The shaft 104 extends above the bearing member 103 and is connected to the shaft of a hydraulic motor 105. The housing of the hydraulic motor is provided with an ear 106 connected by a link 107 to an ear 108 fixed to the post 55. The arm 100 has a connection 109 to one end of a hydraulic shock absorber structure 110 which has the other end connected to an ear 111 on the post 55. The arrangement of the connection 109 and ear 111 is such that the line of the shock absorber is at an angle to that of the brush arm 100. There is a spring sleeved on the shock absorber with one end engaged with an abutment 113 on said shock absorber and the other end of the spring is engaged with an abutment 114 whereby the spring 112 urges elongation of the shock absorber and tends to swing the arm of the post 55 toward the vehicle. This force is light and the pressure of the brush against the vehicle compresses the spring 112 so that the brush and brush arm are normally positioned during washing operations as illustrated in FIG. 2.

If the brush meets resistance to rotation or tends to hang on any parts of the vehicle this resistance tends to cause the housing of the hydraulic motor 105 to rotate in the opposite direction to the rotation of the brush, and through its connection by the link 107 overcomes the pressure of the spring 112 and moves the brush arm outwardly away from the vehicle to reduce the resistance and permit the brush to move around the obstruction on the vehicle. This arrangement of the hydraulic motor and the brush drive provides a balance with the spring 112 to control the pressure of the brush against the vehicle and the shock absorber retards the rate of movement in either direction. The hydraulic motor is supplied with fluid pressure from the pump 87 and therefore only operates during the washing cycle.

With the washing apparatus constructed as illustrated and described, particularly in a coin operated arrangement, coins are dropped into a coin receptacle to initiate actuation of a control circuit (not shown). The vehicle is then moved to the wash position within the path of travel of the carriage. Upon reaching the proper position, controls are energized to supply water and detergent through the conduit 41 to the spray unit and the drive motor 9 is connected in circuit to energize the motor and drive the carriage to move same in its path around the vehicle. The motor 88 is also connected in the circuit to drive the pump 87 supplying pressure to the ram 96 to extend same and swing the standard and post thereon rearwardly, moving the brush assembly and mop assembly toward the vehicle, the mop assembly moving outwardly to extend over the vehicle so the fabric member 48 engages the upper surfaces thereof rearwardly of the spray unit.

The brush assembly moves until the brush 47 engages the side of the vehicle. Fluid pressure is also delivered by the pump 87 to the hydraulic motor 105 to drive the brush and also to the ram 75 to reciprocate the mop member 48. The motor 9 is a two-speed type and during the wash operation, it moves at a slower rate, taking, for example, 1 and ½ minutes to make two orbits. Upon the completion of the two orbits, the speed is increased whereby two additional orbits for rinsing are made in approximately one minute. The high pressure sprays of hot water and detergent directed on the vehicle, and the wiping of the vehicle surfaces by the brush on the sides, front and rear, and the top surfaces by the member 48, tends to remove scum, soil, and the like. Upon completion of the two wash orbits, the power to the motor 88 is interrupted, stopping the pump 87, which in turn stops the hydraulic motor 105, stops the oscillating ram 75, and also stops the pressure to the ram 96 whereby the spring overcomes same and swings the standard and post thereon, retracting the brush assembly and mop assembly from the vehicle, and moving the clutch member 64 into engagement with the clutch member 65.

The carriage continues to move about the vehicle with rinse water being applied to the spray unit. During this operation, the brush and mop assemblies trails the carriage, and due to the length thereof, when the carriage is moved around a curve could require the walls to be spaced substantially outwardly from the path required for the carriage. However, as the guide means follows the curve of the track and steers the wheels 7 it also through its connection from the spindle 30, arm 33, link 68, and arm 67, rotates the clutch member 65 which turns the clutch member 64 and through the rod 62 turns the mop support arm 56 on the post toward the vehicle to a position substantially as illustrated in the broken lines in FIG. 3. This reduces the size of the area required for movement of the washing apparatus around the vehicle. When the rinsing operation has ceased, the carriage returns to its initial position substantially as illustrated in solid lines in FIG. 3 whereby the vehicle can then be moved from the washing position.

It is to be understood that while I have illustrated and described one form of my invention, it is not to be limited to the specific form and arrangement of parts herein described and shown.

What I claim is:

1. A car washing apparatus including a carriage mounted for movement along a predetermined path to wash an automobile parked in such path, said apparatus comprising:
   a. a top mop mounting assembly mounted on said carriage for movement therewith, said mounting being swingable on said carriage from a position transversely of the direction of travel of the carriage to a position longitudinally of said direction;
   b. means selectively swinging said mounting assembly to said transverse position for mopping said automobile;
   c. means selectively swinging said mounting assembly to said longitudinal position;
   d. and means responsive to change of direction of the path of the carriage and operatively connected to the mop mounting means when in said position longitudinally of the path of the carriage to swing the mop mounting assembly toward the automobile but spaced therefrom for reducing the area required for movement of the car washing apparatus and carriage and mop assembly.

2. A car washing apparatus as set forth in claim 1 including:
   a. means operatively connected to said mop mounting assembly for oscillating a mop thereon transversely of the path of movement of the carriage when the mop mounting assembly is positioned transversely of the path of the carriage.

3. A car washing apparatus as set forth in claim 1 wherein the top mop mounting assembly includes:
   a. a swingable arm positioned above the vehicle when the mounting assembly is positioned transversely of the direction of travel of the carriage;
   b. a mop movable longitudinally of said arm and depending therefrom to wipe the vehicle;
   c. means operatively connected to said mop for oscillating same on said arm as the carriage moves in its path.

4. A washing apparatus for washing a parked vehicle positioned in a washing position comprising:
   a. a mobile carriage mounted for movement in an orbit around the vehicle wash position;
   b. a spray boom supported on said carriage;
   c. spray nozzles on said boom with each having an orifice arranged to provide a fan shaped spray directed toward the vehicle;
   d. an arm positioned at an elevation above the top of a vehicle to be washed;
   e. means oscillatably mounted on the carriage and supporting said arm;
   f. mop means carried by said arm and depending therefrom to wipe upper surfaces of a vehicle in the washing position, said mop means consisting of a plurality of side by side strips of fabric material;
   g. means urging said arm to retracted position whereby said mop is out of contact with the vehicle;
   h. means overcoming said urging means to move the arm relative the carriage to position the mop means in vehicle contacting position;
   i. control means for said overcoming means to selectively operate same whereby the mop means contacts the vehicle on washing orbits of the carriage.

5. A car washing apparatus as set forth in claim 4 wherein the means oscillatably mounting the arm includes:
   a. a post swingably mounted and bodily movable to a position rearwardly of the spray boom;
   b. said arm being arranged on the post and extending therefrom and laterally of the carriage when said post is rearwardly of the spray boom.

6. A washing apparatus for washing a parked vehicle in a washing position comprising:
   a. a continuous track around the vehicle washing position in close proximity thereto;
   b. a mobile carriage;
   c. means on the carriage and engaging the track whereby the carriage moves in a path around the vehicle wash position;
   d. a spray boom supported by the carriage and having a plurality of nozzles directing high pressure sprays against the vehicle;
   e. an upright standard;
   f. means swingably mounting said standard for movement about a vertical axis adjacent the boom support whereby the standard swings from a position generally centrally of the carriage to a position rearwardly of said boom support;
   g. an arm at the upper end of the standard and extending therefrom;
   h. a mop frame on said arm;
   i. a mop having a plurality of side by side strips of fabric depending from said mop frame and adapted to wipe a vehicle when the frame mop arm extends from the standard over the vehicle being washed;
   j. means for oscillating said mop frame longitudinally of said mop arm when the arm extends over the vehicle;
   k. means urging the standard mounting to a position wherein the standard is generally centrally of the carriage and the mop arm extends rearwardly of the path of travel of said carriage;
   l. means connected with the mop arm when the standard is in said generally central position and operative in response to the means engaging the track to move the mop arm for a minimum of operating space;
   m. operation means connecting to said standard mounting to swing same to the position rearwardly of the boom;
   n. control means for the washing apparatus and operative to activate said operation means during washing cycles of the carriage and deactivate said operation means during rinse cycles;
   o. means activated by said control means to apply hot water and detergent through the spray nozzles during the washing cycles and water during rinsing cycles.

* * * * *